US006888651B2

(12) United States Patent
Lee

(10) Patent No.: US 6,888,651 B2
(45) Date of Patent: May 3, 2005

(54) SCANNER

(75) Inventor: Pen-Jung Lee, Tao Yuan Hsien (TW)

(73) Assignee: Teco Image Systems Co., Ltd., Taipei (TW)

( * ) Notice: Subject to any disclaimer, the term of this patent is extended or adjusted under 35 U.S.C. 154(b) by 818 days.

(21) Appl. No.: 09/925,492

(22) Filed: Aug. 10, 2001

(65) Prior Publication Data

US 2003/0030851 A1 Feb. 13, 2003

(51) Int. Cl.⁷ .................................................. H04N 1/04
(52) U.S. Cl. ........................................ 358/497; 358/474
(58) Field of Search .................................. 358/497, 494, 358/474, 496, 484, 506, 505, 514, 512, 513, 471, 401, 501, 408, 483, 482; 399/211; 250/208.1, 234–236, 239; 359/209, 210; 382/312, 318, 319

(56) References Cited

U.S. PATENT DOCUMENTS

| | | | | |
|---|---|---|---|---|
| 5,900,951 A | * | 5/1999 | Tsai | 358/497 |
| 5,999,277 A | * | 12/1999 | Tsai | 358/498 |
| 6,424,435 B1 | * | 7/2002 | Kao | 358/497 |
| 6,762,864 B2 | * | 7/2004 | Kao | 358/497 |
| 6,771,399 B1 | * | 8/2004 | Batten | 358/497 |

* cited by examiner

Primary Examiner—Cheukfan Lee
(74) Attorney, Agent, or Firm—Rosenberg, Klein & Lee

(57) ABSTRACT

A scanner includes a sensor rack carrying a sensor, and a guide rod adapted to guide reciprocating movement of the sensor rack, the sensor rack having a guide frame disposed at a bottom side thereof in contact with the guide rod, the guide frame having a double-bevel bottom sidewall formed of two bevel surfaces, which are respectively disposed in contact with the guide rod.

6 Claims, 4 Drawing Sheets

SCANNER

BACKGROUND OF THE INVENTION

The present invention relates to scanners and, more particularly, to a dual fulcrum scanner, which is easy to install and, produces less friction force during installation.

The scanner is a standard attachment to a computer system for scanning text data as well as graphic data into the computer. A scanner uses a light source to project light onto document, and sensor means to pick up the image from reflected light. Scanned image data can be modified by an image processing program. If scanned data is a printed matter, it can be converted into a file and stored in the computer by means of the application of "character recognition software".

FIG. 1 shows a scanner according to the prior art. This structure of scanner comprises a sensor rack 11a holding a sensor 10a, which can be a CCD (charge-coupled device) or CIS (contact image sensor). The sensor rack 11a has an axle sleeve 12a and a belt clamp 13a at the bottom side. The axle sleeve 12a is sleeved onto a guide rod 14a. The belt clamp 13a is fastened to a belt 15a for enabling the sensor rack 11a to be moved back and forth along the guide rod 14a. Further, spring means 16a is provided between the sensor rack 11a and the sensor 10a. The spring means 16a imparts an upward pressure to the sensor 10a, causing the top slide 17a of the sensor 10a to be stopped at the glass 18a for focusing control. This structure of scanner is functional, however it has drawbacks. Because the guide rod 14a must be inserted through the axle sleeve 12a, the installation of the scanner is complicated. Further, the surface contact between the axle sleeve 12a and the guide rod 14a produces a great friction force upon movement of the axle sleeve 12a on the guide rod 14a, and the friction force results in unstable movement of the sensor rack 11a and the sensor 10a.

SUMMARY OF THE INVENTION

The present invention has been accomplished to provide a scanner, which eliminates the aforesaid drawbacks. It is one object of the present invention to provide a scanner, which enables the bottom guide frame of the sensor rack to be directly put on the guide rod during installation, so that the installation procedure is simplified, and the installation cost is greatly reduced. It is another object of the present invention to provide a scanner, which guides the guide frame of the sensor rack in contact with the guide rod at two points of contact, so that the friction resistance between the guide frame and the guide rod is minimized. It is still another object of the present invention to provide a scanner, which has the guide injection-molded on the bottom frame to minimize the manufacturing cost. To achieve these and other objects of the present invention, the scanner comprises a sensor rack, a sensor mounted on the sensor rack, and a guide rod adapted to guide reciprocating movement of the sensor rack. The sensor rack has a guide frame disposed at the bottom side in contact with the guide rod. The guide frame has a double-bevel bottom sidewall formed of two bevel surfaces, which are respectively disposed in contact with the guide rod.

DETAILED DESCRIPTION OF THE PREFERRED EMBODIMENT

Figure 1:
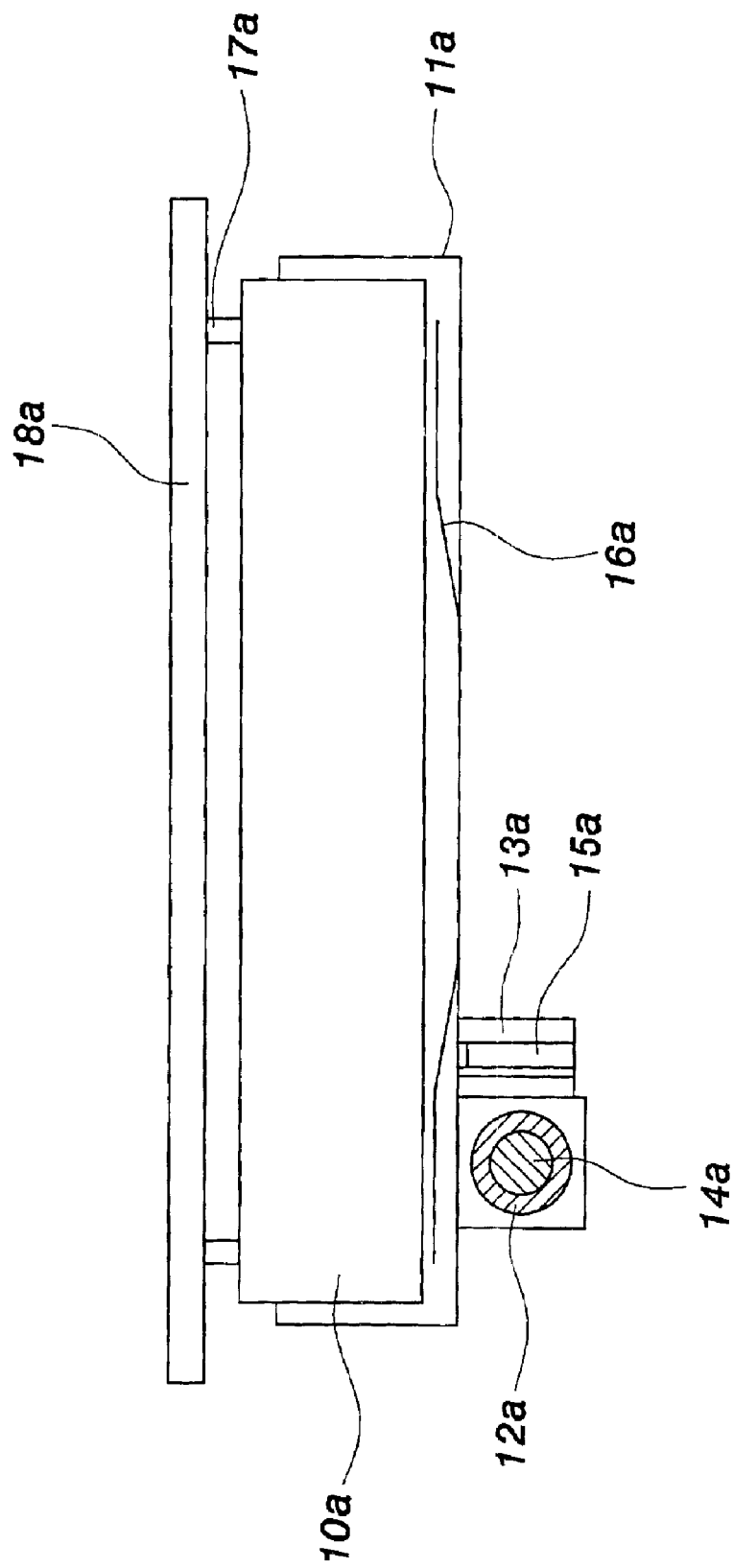
FIG. 1 is a plain view of a scanner according to the prior art.
Figure 2:
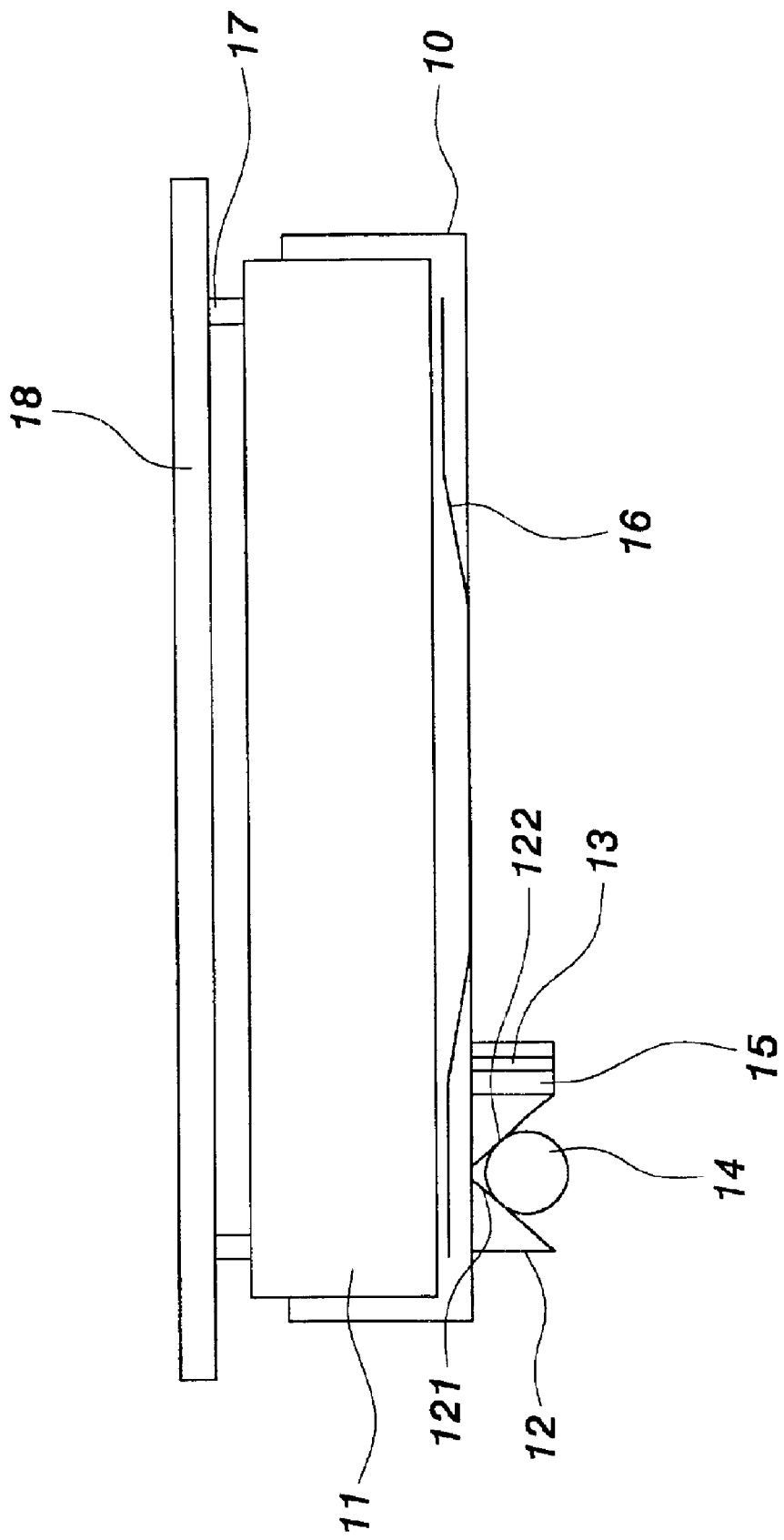
FIG. 2 is a plain view of a scanner according to a first embodiment of the present invention.

Referring to FIG. 2, a scanner in accordance with a first embodiment of the present invention is shown comprising a sensor rack 10 movably mounted in the housing (not shown) thereof. The sensor rack 10 carries a sensor 11, which can be a CCD (charge-coupled device) or CIS (contact image sensor). The sensor rack 10 comprises a guide frame 12 and a belt clamp 13 provided at the bottom side thereof. The guide frame 12 has a double-beveled bottom sidewall formed of two bevel contact surfaces 121;122. A guide rod 14 is fixedly provided inside the housing of the scanner below the sensor rack 10. The guide frame 12 is directly put on the guide rod 14. The belt clamp 13 is fastened to a belt 15, which is driven to move the sensor rack 10 back and forth on the guide rod 14 in the scanning path, enabling the sensor 11 to pick up the image of document. Spring members 16 are provided between the sensor 11 and the sensor rack 10. The spring members 16 can spring leaves or coil springs. The sensor 11 has slides 17 upwardly extended from the top side thereof. A glass 18 is fixedly provided in the housing of the scanner above the sensor 11. The spring members 16 impart an upward pressure to the sensor 11, forcing the slides 17 into close contact with the glass 18 to control the focal length of the sensor 11.

As stated above, the guide frame 12 is provided at the bottom side of the sensor rack 10 and directly put on the guide rod 14. This installation procedure is simple. After installation of the sensor rack 10, the two bevel surfaces 121;122 are disposed in contact with the guide rod 14 at a respective contact point. The limited contact area (two contact points) between the bevel surfaces 121;122 of the guide frame 12 and the guide rod 14 causes less friction resistance during movement of the sensor rack 10 on the guide rod 14.

Figure 3:
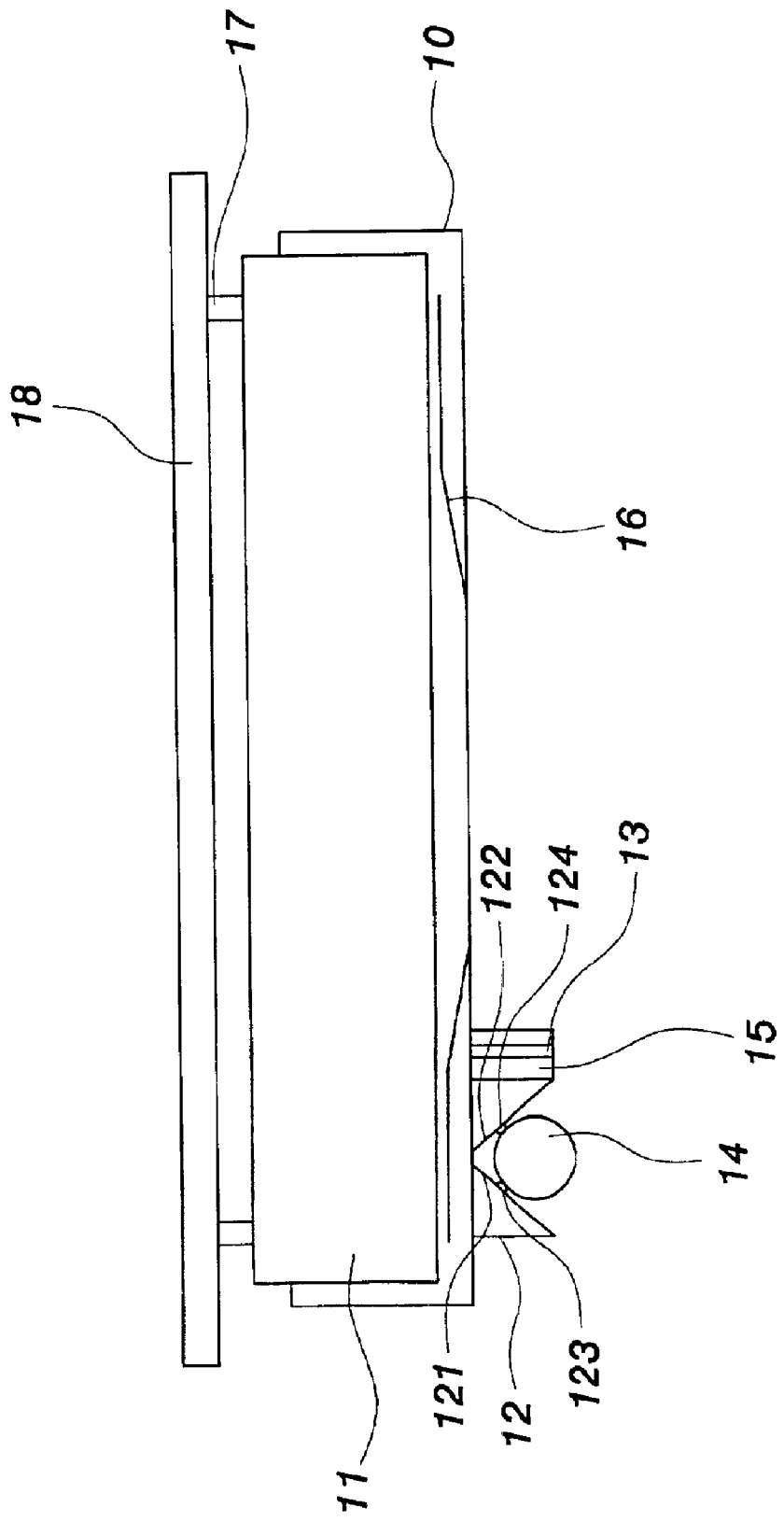
FIG. 3 is a plain view of a scanner according to a second embodiment of the present invention.

FIG. 3 shows a scanner according to a second embodiment of the present invention. According to this embodiment, the bevel surfaces 121;122 of the guide frame 12 have a respective raised portion 123 or 124 respectively disposed in contact with the guide rod 14. Because of point of contact, less friction resistance is produced during movement of the sensor rack 10 on the guide rod 14.

Figure 4:
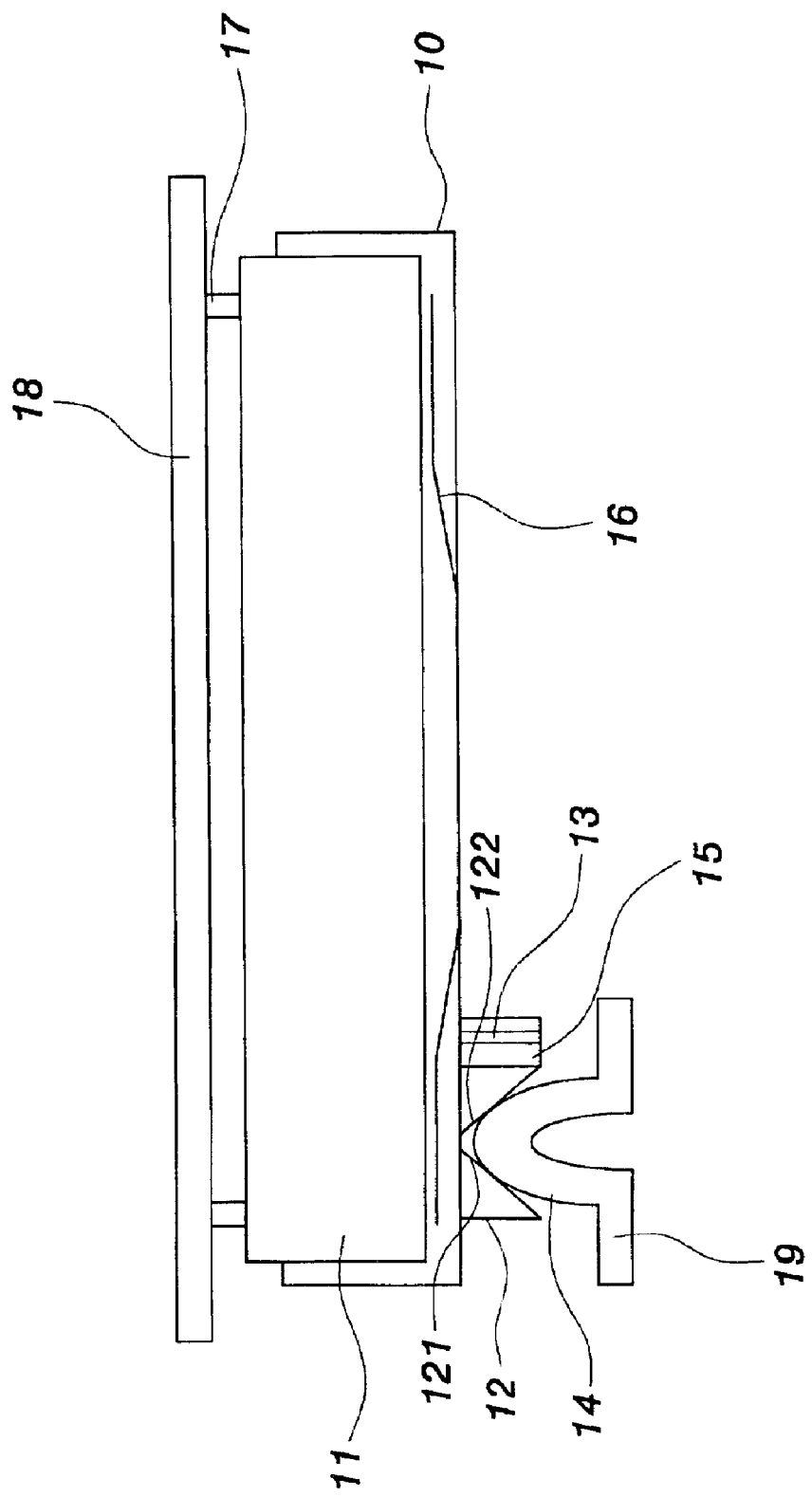
FIG. 4 is a plain view of a scanner according to a third embodiment of the present invention.

FIG. 4 shows a scanner according to a third embodiment of the present invention. According to this embodiment, the guide rod 14 is directly injection-molded on the bottom frame 19 of the scanner. During installation, the guide frame 12 is directly put on the guide rod 14 to guide movement of the sensor rack 10 on the guide rod 14.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A scanner comprising:
   a sensor rack having a guide frame at a bottom side thereof, said guide frame having a double-bevel bottom sidewall formed of two bevel surfaces;
   a sensor mounted on said sensor rack; and
   a guide rod fixedly provided below said sensor rack and disposed in contact with each of the bevel surfaces of said guide frame.

2. The scanner of claim 1 wherein said sensor rack further comprises a belt clamp disposed at the bottom side and fastened to a belt to be driven to move said sensor rack along said guide rod.

3. The scanner of claim 1 wherein the bevel surfaces of said guide frame each have a respective raised portion respectively disposed in contact with said guide rod.

4. The scanner of claim 1 further comprising spring means provided between a bottom side of said sensor and said sensor rack.

5. The scanner of claim 4 further comprising a glass provided above said sensor, and at least one slide fixedly provided at a top side of said sensor and forced into contact with said glass by said spring means.

6. The scanner of claim 1 wherein said guide rod is injection-molded on a bottom frame of the scanner.

* * * * *